United States Patent [19]

Lever

[11] 4,275,042
[45] Jun. 23, 1981

[54] REMOVAL OF OXALATE FROM BAYER PROCESS LIQUOR

[75] Inventor: Gordon Lever, Kingston, Canada

[73] Assignee: Alcan Research and Development Limited, Montreal, Canada

[21] Appl. No.: 114,281

[22] Filed: Jan. 22, 1980

[51] Int. Cl.³ .............................. C01F 7/06; C01F 7/46
[52] U.S. Cl. ..................................... 423/130; 423/121; 423/127; 23/301; 23/302 T
[58] Field of Search ............... 423/119, 121, 130, 600, 423/111; 23/301, 302 T

[56] References Cited

U.S. PATENT DOCUMENTS

| | | | |
|---|---|---|---|
| 3,337,305 | 8/1967 | Byrns | 423/121 |
| 3,457,032 | 7/1969 | Breteque | 423/112 |
| 3,899,571 | 8/1975 | Yamada et al. | 423/130 |
| 4,038,039 | 7/1977 | Carruthers | 423/121 |
| 4,046,855 | 9/1977 | Schepers et al. | 423/121 |
| 4,101,629 | 7/1978 | Mercier et al. | 423/121 |

FOREIGN PATENT DOCUMENTS 207884 12/1967 U.S.S.R. .................................. 423/600

Primary Examiner—Herbert T. Carter
Attorney, Agent, or Firm—Cooper, Dunham, Clark, Griffin & Moran

[57] ABSTRACT

Sodium oxalate in supersaturated solution in Bayer spent liquor stabilized by the presence of humic material is precipitated by the treatment with cationic sequestrants which interact with the humic material to give an insoluble product, thus removing it from solution and destabilizing the solution with respect to precipitation of sodium oxalate. Preferred cationic sequestrants are quaternary nitrogen compounds including medium or long chain alkyl groups. Precipitation of sodium oxalate can be expidited by addition of seed crystals and/or addition of sodium oxalate solution which is supersaturated at a temperature higher than that of the spent liquor.

15 Claims, 1 Drawing Figure

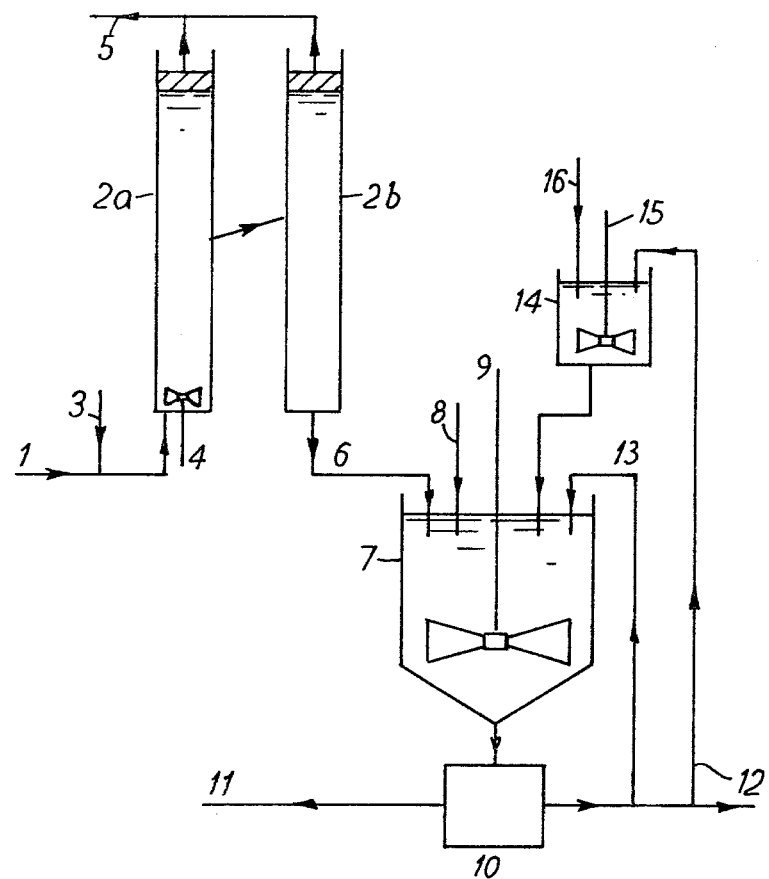

REMOVAL OF OXALATE FROM BAYER PROCESS LIQUOR

The present invention relates to improvements in the Bayer process for the manufacture of alumina (as trihydrate) from bauxite ores. In particular the invention is directed to the removal of oxalate, generally as the disodium salt, from Bayer process liquor.

Bauxites as mined usually contain from 0.1 to 0.3% by weight of organic carbon, but occasionally organic carbon contents of up to 0.6% are found when surface bauxites are mined. It is generally believed that the organic carbon is present in the form of humic substances. Typically, on digestion of the bauxite during the Bayer process more than half of this organic carbon is extracted into the liquor. With recycling of the Bayer liquor the concentration of these humic substances and their degradation products builds up to an equilibrium concentration depending on the amount of organic carbon present in the bauxite and the organic carbon losses during the processing. The accumulated humic matter and its breakdown products are known to cause numerous process problems.

There are other possible sources of organic carbon in Bayer liquor. Examples include organic compounds added as flocculating agents and anti-foaming agents. However, such compounds represent only a small proportion of the total organic carbon in recycled Bayer liquor and we do not believe that these compounds or their breakdown products contribute significantly to the problems which arise from the presence of organic carbon in the bauxite.

It will be appreciated that in Bayer liquor, which is strongly alkaline, any acidic materials will be present chiefly in the form of salts with metal ions present (chiefly $Na^+$). Reference to acids in the Bayer liquor should be understood as referring to their salts, especially sodium salts, as appropriate.

The presence of such organic materials in bauxite gives rise to sodium oxalate in the Bayer liquor. The concentration of oxalate can build up sufficiently to precipitate crystalline sodium oxalate from the liquor. This can give rise to various process problems and it is desirable to remove sodium oxalate from the Bayer process to prevent its precipitation. Previously described attempts to effect this include U.S. Pat. No. 3,337,305 which describes a method in which sodium oxalate and other salts such as vanadate and carbonate is precipitated from solution by the addition of aqueous ammonia, typically in an amount of more than 10% and up to 30% by weight of the Bayer liquor. In U.S. Pat. No. 3,649,185 sodium oxalate precipitation is effected by raising the soda concentration by adding NaOH, thus reducing the solubility of the oxalate. U.S. Pat. No. 3,899,571 relates to a method in which seeding with activated crystals of sodium oxalate stimulates precipitation. Other processes which can generally be summarised as evaporative concentration followed by salting out are historically well known to those skilled in the art and, indeed are still practised as a way of removing excess $Na_2CO_3$. Such methods are less readily applicable to removal of oxalate and are relatively expensive, producing an impure product.

U.S. Pat. No. 3,457,032 describes a rather different approach to removal of impurities. The method involves passing the Bayer liquor through a bed of a strongly basic anion exchange resin to eliminate anions containing iron, silicon, titanium or zinc. It is mentioned that the process can also eliminate the organic impurities from the liquor. However, although the invention includes the possibility of regenerating spent anion exchange resin, the elimination of the organic impurities by this method is expensive. It is not directed towards the selective removal of sodium oxalate.

The organic material present in bauxite is generally of relatively high molecular weight, i.e. greater than 500, as estimated by ultrafiltration. This material and its initial degradation products (of similarly high molecular weight) constitute what we refer to herein as the "humic matter" present in the Bayer liquor. The humic matter in the liquor is a highly coloured anionic polyelectrolyte.

Under the hot, highly alkaline conditions of the Bayer process the humic matter is gradually decomposed eventually to low molecular weight compounds. We believe that the decomposition proceeds through intermediate degradation products comprising mainly benzene carboxylic acids and phenolic acids, presumably as the respective sodium salts. The bulk of eventual degradation products are low molecular weight carboxylic acids, principally formic, acetic and oxalic acids as their sodium salts. Sodium oxalate gives rise to problems in the Bayer process because of its limited solubility in the caustic Bayer liquor. When it comes out of solution the sodium oxalate forms a fine crystalline precipitate which can interfere with alumina trihydrate precipitation in the Bayer process.

The humic matter has an indirect effect in that it inhibits the precipitation of sodium oxalate from supersaturated solution in the Bayer liquor. Substantial concentrations of sodium oxalate in excess of saturation can be produced and although this delays the time at which problems with sodium oxalate precipitates start, the sudden crystallisation of the excess sodium oxalate can give rise to even greater problems. The precipitation inhibiting effect of the humic matter makes it difficult to control the concentration and undesirable precipitation of sodium oxalate.

The present invention is based on the surprising discovery that precipitation of sodium oxalate from supersaturated Bayer liquors can be stimulated by removing humic matter from the liquor. It is particularly surprising that removing only a small proportion of the humic matter can be highly effective in stimulating the precipitation of sodium oxalate. Typically the quantity of sodium oxalate precipitated may be several times as large as the amount of humic matter removed from the liquor.

The present invention accordingly comprises a method for controlling the level of sodium oxalate present in the process liquor in the Bayer process for the production of alumina trihydrate which method comprises the steps of treating spent liquor which contains in excess of 1 gram per liter (as organic carbon) of humic matter and is supersaturated with regard to sodium oxalate, with a cationic sequestrant in an amount to remove sufficient of the said humic matter but not more than 0.5 gram per liter from the said liquor and thereby destabilizing the said liquor with regard to precipitation of sodium oxalate, holding the said liquor to allow precipitation of sodium oxalate, separating the precipitated sodium oxalate and spent cationic sequestrant and returning the said liquor to the Bayer process.

The present invention is applied to "spent Bayer liquor" by which term we mean Bayer liquor from which alumina trihydrate has been precipitated and separated. Because spent Bayer liquor is highly alkaline and contains appreciable quantities of aluminium as dissolved aluminate, it is recycled to the bauxite digestion stage of the Bayer process. It is common practice to remove excessive levels of inorganic salts, especially sodium carbonate, from the Bayer process circuit at the spent liquor stage by treatment of all or part of the liquor. Such treatments can be combined with the method of the present invention which itself may be applied to all or part of the spent liquor as appropriate in the particular operating conditions.

The cationic sequestrants which can be used in the method of the present invention must satisfy the following requirements:

1. they must possess a cationic centre which is sufficiently strong to interact with the weakly acidic (anionic) centre(s) in the humic matter, and
2. the product of the interaction between the cationic sequestrant and the humic matter must be sufficiently insoluble in the Bayer liquor to permit its physical separation therefrom. The cationic centre is most conveniently based on nitrogen and especially a quaternary nitrogen atom, because such groups are sufficiently cationic that they interact readily with the acidic (anionic) centres in the humic matter and can be provided in compounds producing insoluble interaction products. This requirement for insolubility in the interaction products is generally achieved by including a suitable hydrophobic group in the molecule. Suitable hydrophobic groups include long chain alkyl groups e.g. those having more than 10 carbon atoms in the chain and incorporation of the quaternary nitrogen atom in a heterocyclic ring e.g. imidazoline and pyridine especially where the nitrogen atom carries at least one long chain alkyl group. Where the quaternary nitrogen atom is in a quaternary ammonium group then it is particularly convenient that one or two of the substituent groups are derived from tallow, especially hydrogenated tallow. Alkyl groups derived from tallow have a spread of chain lengths mainly from $C_{12}$ to $C_{20}$ with the bulk of the alkyl groups (typically more than 90%) being $C_{16}$ or $C_{18}$ alkyl groups. Alkyl groups derived from hydrogenated tallow can be incorporated into quaternary ammonium compounds. Such compounds are commercially available in Canada, e.g. under the trade name Arquad and Armosoft from Armak Chemicals Limited. Suitable compounds include tallow-trimethyl-ammonium salts, ditallow dimethyl ammonium salts, tallow-benzyl-dimethyl ammonium salts, ditallow-benzyl-methyl ammonium salts, tallow-dibenzyl-methyl ammonium salts and the hydrogenated tallow analogues thereof.

Where the quaternary nitrogen atom is in a ring the other N-substituent will generally be or include a medium or long chain, i.e. at least $C_8$ (medium) or $C_{10}$ (long), alkyl group. Examples include lauryl pyridinium salts and diethyl-heptadecyl-imidazolinium salts.

The complementary anion in the quaternary nitrogen compounds exemplified above will usually be chloride although it may be sulphate if desired. For imidazolinium salts we have found the ethyl sulphate salts convenient to use. Although these salts may, but need not, be water soluble, in the highly alkaline Bayer liquor they will usually be present as the hydroxides.

The amount of cationic sequestrant used in contact with the Bayer liquor depends on the amount of humic matter and sodium oxalate in solution in the liquor. The greater the degree of supersaturation with sodium oxalate the less humic matter need be removed to initiate oxalate precipitation. The invention is directed to partial removal of the humic matter thus destabilizing the sodium oxalate in supersaturated solution causing it to precipitate. The solubility of sodium oxalate in Bayer liquor is directly related to temperature and inversely related to caustic soda concentration (conventionally caustic soda concentrations are expressed as sodium carbonate equivalent). Thus, at 50° C. the solubility of sodium oxalate is between 2 and 2.5 gpl, usually between 2.1 and 2.3 gpl at caustic soda concentrations of 160 to 190 gpl and between 1.5 and 2 gpl at caustic soda concentrations of 200 to 220 gpl. The concentrations of supersaturated oxalate liquors specifically referred to below relate to Bayer liquor having a caustic soda concentration of from 160 to 190 gpl. Minor adjustments can readily be made where different caustic soda concentrations, and therefore different degrees of supersaturation (for any particular absolute concentration of oxalate) of oxalate in the liquor, are used.

Generally the amount of cationic sequestrant added will be just sufficient to initiate an adequate degree of precipitation to oxalate. For typical Bayer liquors where the concentration of sodium oxalate is greater than the saturation value but less than that at which precipitation occurs despite the stabilizing effect of the humic matter, the amount of cationic sequestrant necessary is typically up to 0.5 gpl, more usually 0.05 to 0.2 gpl. These figures relate specifically to oxalate concentrations between 4 and 6 gpl. Higher oxalate concentrations will need smaller amounts of cationic sequestrant.

After contacting the Bayer liquor with the cationic sequestrant, thus removing sufficient humic matter to destabilize the sodium oxalate in solution, the liquor is held to allow precipitation of the oxalate. Especially where the degree of supersaturation of sodium oxalate in the liquor is low, e.g. at concentrations between 3 and 4 gpl, it may be desirable to add sodium oxalate seed in an amount of from 0.2 to 1.0 gpl to the treated liquor to speed up precipitation. The oxalate crystals used as seed can be of oxalate removed from Bayer liquor by the method of the present invention. However, to obtain best results the seed used should be adequately active. Activity can be enhanced by washing the oxalate crystals with alcohol or by grinding them so as to produce crystals having non-contaminated surfaces.

The driving force behind oxalate precipitation from solutions of low degrees of supersaturation can be increased by adding to the treated liquor a solution of sodium oxalate which is supersaturated at a temperature higher than that of the liquor, thus increasing the oxalate concentration in the liquor. Conventional flocculating agents may also be added to enable better separation of the precipitated oxalate, especially by stimulating more rapid settling of the solid oxalate. Typically, the treated liquor will precipitate oxalate in a period of from ½ to 10 hours after treatment depending mainly on the degree of supersaturation of the oxalate solution, the higher the degree of supersaturation the shorter the time. With the use of seed or additional oxalate solution as described above even liquors having a low degree of supersaturation, e.g. 3 to 4 gpl total oxalate will usually precipitate the excess oxalate in from 2 to 4 hours. The precipitated oxalate can be separated from the liquor by any convenient means, e.g. filtration, centrifugation or settling. It is usually desirable to agitate, e.g. by stirring the destabilized liquor to encourage rapid completion of oxalate precipitation. The liquor from which excess oxalate has been precipitated can be returned to the Bayer process cycle.

The Bayer liquor treated in this invention is the "spent" liquor from the alumina trihydrate precipitation stage. Alumina trihydrate precipitation is usually carried out at a temperature between 50° and 70° C., commonly at about 65° C. The spent liquor is naturally at approximately or slightly below the temperature used for alumina precipitation. We have found that the treatment to remove part of the humic matter can conveniently be carried out at such temperatures especially from 55° to 65° C.

There are several different techniques by which the Bayer liquor can be treated to remove part of the humic matter. The simplest is where the humic matter is removed from solution as a solid phase in combination with the cationic sequestrant. This will be the situation where ion-exchange resin and where some of the higher melting point quaternary nitrogen compounds are used. The solid phase product can simply be separated with the precipitated sodium oxalate. We have found that ion-exchange resins, such as those mentioned in U.S. Pat. No. 3,457,032, when added in finely ground form to oxalate supersaturated Bayer liquor, will remove humic material from the liquor and thus promote oxalate precipitation. However, ion-exchange resins are not as effective as the cationic sequestrants used in the present invention and the use of such resins is more expensive and less convenient because they require grinding before use and it is more difficult to disperse them uniformly in the liquor.

In these techniques the cationic sequestrant will usually be added in a suitable amount to the liquor in a vessel. To obtain uniform removal of the humic matter the cationic sequestrant is preferably finely divided. Finely divided quaternary nitrogen compounds can be made but fine division in the fresh cationic sequestrant is more usually obtained by forming solutions or suspensions in water/isopropanol mixtures. It is also desirable to disperse the cationic sequestrant in the liquor and this can conveniently be achieved by stirring or air agitation.

The products of the interaction between the humic matter and some cationic sequestrants take the form of liquor immiscible liquids usually of lower density than the liquor. Such products are commonly obtained with quaternary nitrogen compounds which are liquids or low melting point solids (many have a waxy appearance). These interaction products may be removed by conventional liquid-liquid separation methods conveniently of the "stack pipe" kind. This sort of separation technique makes it relatively easy to remove the spent sequestrant separately from the oxalate, especially prior to oxalate precipitation. It will generally not be convenient to separate the liquid spent sequestrant and the solid precipitated oxalate from the liquor in a single separation step.

Where the spent sequestrant is a liquid it will readily be appreciated that it can be removed substantially continuously and this gives rise to the possibility of operating in a continuous or semi-continuous way. One particular way of doing this is described more fully below.

Although the spent sequestrant separated prior to precipitation of the oxalate may be regenerated, it is not usually economically attractive to recover the small quantities used. The added complexity of recovery will not usually be compensated by the relatively small reduction in cost made possible by recovery.

Further details of specific processes for operating the invention are discussed in more detail below, especially with reference to the drawing in which:

FIG. 1 is a flow diagram illustrating an embodiment which is adapted for use when the interaction product of the sequestrant and the humic matter is a liquid.

FIG. 1 illustrates an embodiment of the invention in which a sequestrant 3 is added to spent Bayer liquor 1 and the mixture is fed in sequence to separation vessels 2a and 2b past stirrer 4. The sequestrant in this embodiment is one which forms a liquid interaction product with the humic matter which floats to the surface of the liquor in the separation vessels 2a and 2b and is removed as necessary 5. The treated liquor 6 is passed to a precipitation vessel 7 equipped with stirrer 9. Flocculating and/or settling agents 8 may be added if desired. The slurry of precipitated oxalate in the liquor is filtered through filter 10 to give liquor 11 for return to the process circuit and by-product solid sodium oxalate 12. A portion of the solid oxalate 13, after activation as necessary, may be returned to the precipitation vessel as seed. A further portion of the solid oxalate 12 may be passed to vessel 14 equipped with stirrer 15. In this vessel a solution of oxalate in water 16 is prepared which is saturated with respect to oxalate at a temperature $T_1$.

This solution is added to the liquor in the precipitation vessel which is at temperature $T_2$. $T_1$ is a higher temperature than $T_2$ and is chosen so that the solution added to the precipitation vessel increases the degree of supersaturation in the precipitation vessel which is at temperature $T_2$. Typically where $T_2$ is about 60° C. $T_1$ will generally be between 75° and 95° C.

In FIG. 1 the spent sequestrant 5 can be treated to re-activate it. However, because the quantity employed in this embodiment is relatively small it is not usually worthwhile recovering.

As those skilled in the art will appreciate, the filter 10 could be replaced by a series of settling tanks and if necessary a clarification filter for the spent liquor and a dewatering filter for sodium oxalate. Concentrated slurry obtained from a series of settling tanks could be used as a source of oxalate for preparing concentrated oxalate solution to replace the solid oxalate as described above.

The invention is further illustrated by the following Examples.

EXAMPLE 1

250 ml of Bayer plant spent liquor with a sodium oxalate concentration of 5.9 g/l was stirred at 60° C. for 75 minutes after the addition of 0.1 g/l Armosoft L (Ditallow dimethyl ammonium chloride manufactured by Armak Chemicals Limited). The precipitated high molecular weight organics and sodium oxalate were filtered off and the liquor analysed for sodium oxalate content which was found to have decreased to 2.6 g/l.

EXAMPLE 2

250 ml of Bayer plant spent liquor with a sodium oxalate content of 5.6 g/l was stirred vigorously for 10 minutes with 0.05 g/l Arquad B100 (Alkyl benzyl dimethyl ammonium chloride manufactured by Armak Chemicals Limited), for 10 minutes. 0.2 g/l sodium oxalate seed was then added and the liquor stirred gently at 60° C. for a further 2 hours. The liquor was filtered and then analysed for sodium oxalate. The sodium oxalate concentration had decreased to 2.4 g/l.

EXAMPLE 3

8 l of Bayer plant spent liquor with a sodium oxalate content of 4.6 g/l was stirred with 1 ml of Armosoft L (Ditallow dimethyl ammonium chloride) at 60° for 10 minutes. 0.2 g/l sodium oxalate seed was then added and the solution stirred gently for 2 hours. The precipitated sodium oxalate was then flocculated and settled by the addition of Synfloc RM30 (American Cyanamid) at the rate of 0.1 g/kg of sodium oxalate. After 30 minutes the flocculated sodium oxalate had settled into the lower 1/5 of the reaction vessel. The sodium oxalate content of the settled liquor was 2.6 g/l.

EXAMPLE 4

A precipitation tank with conical bottom and volume of approximately 250 l was filled with Bayer plant spent liquor at 60° C. at a rate of 6 l/min. Armosoft L was pumped into the liquor stream at 1.5 ml/min. to give a final concentration of active quaternary salt of about 0.2 g/l. After the 200 l had been introduced, 40 g of sodium oxalate seed was added. The liquor was gently stirred every 15 mins. The sodium oxalate concentration of the liquor decreased with time as follows:

|  | Original liquor | 4.53 g/l |
|---|---|---|
| time after | 45 min. | 3.83 g/l |
| addition of | 75 min. | 3.34 g/l |
| seed | 135 min. | 3.10 g/l |

EXAMPLE 5

250 ml sample of Bayer liquor with a sodium oxalate content of 3.5 gpl was evaporated from an initial caustic concentration of 176 gpl (as $Na_2CO_3$) to 220 gpl. After cooling to 60° C., 0.5 ml of 60 gpl solution of sodium oxalate at 95° C. was added followed by 0.1 gpl Armosoft "L". The solution was stirred for 3 hours and then filtered. The oxalate level in the liquor was measured and found to be 1.6 gpl.

EXAMPLES 6 TO 9

These Examples illustrate the operation of the embodiment of the invention generally illustrated in FIG. 1, but using a series of two (Example 6) or three (Examples 7, 8 and 9) precipitation vessels before filtration. Further, the solid oxalate used to form the additional saturated solution for addition to the (first) precipitation vessel is advantageously purified especially to remove any residual humic matter adsorbed thereon by treatment with a quaternary ammonium compound. The residence time in the mixing column (2a in FIG. 1) was about 5 min. and in the separating column (2b in FIG. 1) was about 1 min.

EXAMPLE 6

Two precipitators were arranged in series of volumes 0.5 and 3.5 l respectively. Spent Bayer liquor at 60° C. having an oxalate concentration of 4.9 g/l was treated with 0.2 g/l Arquad B100 and after separation of the spent cationic sequestrant was passed to the precipitators. The liquor flow rate was 1.5 l/hour for 5½ hours after the second precipitation vessel was full (giving a precipitation time of 2 hr. 40 min.) and thereafter was increased to 1.7 l/hr (giving a precipitation time of 2 hr. 30 min.) for a further 2½ hours. Concentrated oxalate solution having a concentration of 40 g/l at 75° C. produced from recovered oxalate purified with Arquad 2HT/100 was added to the first precipitator at a rate of 36 ml/hr. After removal of the suspended solid oxalate by filtration of the liquor from the second precipitator the average oxalate concentration was 2.8 g/l at the 1.5 l/hr flow rate and 3.1 g/l at the 1.7 l/hr flow rate.

EXAMPLE 7

Three precipitators were arranged in series of volumes 0.75, 1.5 and 2.25 l respectively. Spent Bayer liquor at 60° C. having an oxalate concentration of 3.85 g/l was treated with 0.2 g/l Arquad B100 and after separation of the spent sequestrant was passed to the precipitators at a flow rate of 1.5 l/hr (giving a precipitation time of 3 hours). As in Example 6, concentrated oxalate solution 40 g/l at 75° C. purified with Arquad 2HT/100 was added to the first precipitator. Initially the rate of addition was 72 ml/hr for the first 30 min. and thereafter at 36 ml/hr. These rates of addition correspond to raising the oxalate concentration by 2 g/l and 1 g/l respectively. The concentration of oxalate in the liquor from the third precipitator after filtration of the solid oxalate was monitored. The concentration fell steadily from 2.5 g/l at time O (when the third precipitator was filled, i.e. 3 hours after starting the liquor flow) to 2 g/l after 2 hours and about 1.85 g/l after 4 hours.

EXAMPLE 8

The equipment used was the same as in Example 7. Spent Bayer liquor at 60° C. having an oxalate concentration of 4.2 g/l was treated with 0.2 g/l Arquad B100 as in Example 7 and passed to the first precipitator at a flow rate of 1.5 l/hr. Concentrated oxalate solution 40 g/l at 75° C. made from unpurified product oxalate was added to the first precipitator initially at a rate of 36 ml/hr and subsequently at a rate of 54 ml/hr. (1 g/l and 1.5 g/l additional oxalate respectively). One hour after the third precipitator was filled the liquor oxalate concentration had fallen to 3 g/l and the average concentration from 1 hour to 4 hours was 3.0 g/l. After 4 hours (i.e. 7 hours from start of flow into first precipitator) the rate of addition of the concentrated oxalate solution was increased. After 5½ hours (i.e. 1½ hours after the increase) the liquor oxalate concentration had fallen to about 2.6 g/l and averaged 2.7 g/l for the following four hours.

EXAMPLE 9

Spent Bayer liquor at 60° C. with an oxalate content of 3.5 gpl was treated with 0.05 gpl Armosoft "L" as in Example 8 and passed to the first precipitator, after separation of the spent agent. The liquor flow rate was 1.5 l/hr. A solution of sodium oxalate of concentration 60 gpl and temperature 95° C. produced from recovered oxalate purified with 0.8 gpl Armosoft "L" was added to the first precipitator at a rate of 120 ml/hr for the first 30 minutes and then at 60 ml/hr. thereafter. The concentration of the liquor from the third precipitator after filtration was monitored. The average concentration of the oxalate in the liquor from 2 to 16 hours after the third precipitator was filled was 2.4 gpl.

I claim:

1. A method for controlling the level of sodium oxalate present in the process liquor in the Bayer process for the production of alumina trihydrate which method comprises the steps of treating spent liquor which contains in excess of 1 gram per liter (as organic carbon) of humic matter and is supersaturated with regard to sodium oxalate, with a cationic sequestrant in an amount to remove sufficient of the said humic matter but not more than 0.5 gram per liter from the said liquor and thereby destabilizing the said liquor with regard to precipitation of sodium oxalate, said sequestrant being an organic cationic sequestrant having a cationic center that interacts with a weakly acidic anionic center in the humic matter to form a product sufficiently insoluble in the Bayer liquor to be physically separable therefrom, holding the said liquor to allow precipitation of sodium oxalate, separating the precipitated sodium oxalate and spent cationic sequestrant and returning the said liquor to the Bayer process.

2. A method as claimed in claim 1 wherein the cationic sequestrant is a quaternary ammonium compound including at least 1 long chain alkyl group.

3. A method as claimed in claim 2 wherein the quaternary ammonium compound is one or more chloride or sulphate salts of tallow-trimethyl ammonium, ditallow-dimethyl ammonium, tallow-benzyl-dimethyl ammonium, ditallow-benzyl-methyl ammonium, tallow-dibenzyl-methyl ammonium and the hydrogenated tallow derivatives thereof.

4. A method as claimed in claim 1 wherein the cationic sequestrant is a heterocyclic quaternary nitrogen compound in which the nitrogen atom carries at least one medium or long chain alkyl group.

5. A method as claimed in claim 4 wherein the cationic sequestrant is a salt of lauryl pyridinium or diethyl-heptadecyl-imidazolinium.

6. A method as claimed in claim 5 wherein the cationic sequestrant is diethyl-heptadecyl-imidazolinium ethyl sulphate.

7. A method as claimed in claim 1 wherein the amount of cationic sequestrant used is from 0.05 to 0.2 grams per liter of the spent liquor.

8. A method as claimed in claim 1 wherein from 0.2 to 1 gram per liter of solid sodium oxalate is added to the treated liquor as seed to speed up precipitation of the solid sodium oxalate.

9. A method as claimed in claim 8 wherein the solid sodium oxalate used as seed is sodium oxalate precipitated from spent liquor by the method of claim 1.

10. A method as claimed in claim 1 wherein the temperature at which the spent liquor is treated is from 55° to 65° C.

11. A method as claimed in claim 1 wherein, prior to precipitation of the sodium oxalate from the spent liquor, a solution of sodium oxalate, which is supersaturated at a temperature higher than that of the spent liquor, is added to the spent liquor.

12. A method as claimed in claim 11 wherein the temperature at which the said solution is saturated is from 75° to 95° C.

13. A method as claimed in claim 1 wherein the treated spent liquor is held for from 0.5 to 10 hours to allow precipitation of the sodium oxalate.

14. A method as claimed in claim 1 in which the insoluble interaction product of the cationic sequestrant and the humic material is removed from the spent liquor prior to precipitation of the sodium oxalate.

15. A method as claimed in claim 14 wherein the insoluble intereaction product is a liquid having a density less than that of the spent liquor and is separated from the spent liquor prior to precipitation of the sodium oxalate by flotation on the upper surface of the treated spent liquor.

* * * * *